United States Patent
Yano et al.

(10) Patent No.: US 10,072,132 B2
(45) Date of Patent: Sep. 11, 2018

(54) CURABLE COMPOSITION

(71) Applicant: Kaneka Corporation, Osaka (JP)

(72) Inventors: Ayako Yano, Hyogo (JP); Mitsuhiro Kasai, Hyogo (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 15/122,356

(22) PCT Filed: Mar. 5, 2015

(86) PCT No.: PCT/JP2015/056468
§ 371 (c)(1),
(2) Date: Aug. 29, 2016

(87) PCT Pub. No.: WO2015/133564
PCT Pub. Date: Sep. 11, 2015

(65) Prior Publication Data
US 2016/0376420 A1    Dec. 29, 2016

(30) Foreign Application Priority Data

Mar. 5, 2014 (JP) ................................. 2014-042768

(51) Int. Cl.
| | |
|---|---|
| C09J 171/02 | (2006.01) |
| C08K 5/12 | (2006.01) |
| C09J 201/10 | (2006.01) |
| C08L 71/02 | (2006.01) |
| C08L 101/10 | (2006.01) |
| C09D 143/04 | (2006.01) |
| C09K 3/10 | (2006.01) |
| C08K 5/092 | (2006.01) |
| C08K 5/11 | (2006.01) |
| C08G 65/336 | (2006.01) |

(52) U.S. Cl.
CPC ................ *C08K 5/12* (2013.01); *C08K 5/092* (2013.01); *C08K 5/11* (2013.01); *C08L 71/02* (2013.01); *C08L 101/10* (2013.01); *C09D 143/04* (2013.01); *C09J 171/02* (2013.01); *C09J 201/10* (2013.01); *C09K 3/1006* (2013.01); *C08G 65/336* (2013.01); *C09K 2200/0655* (2013.01)

(58) Field of Classification Search
CPC .. C08K 5/10; C08K 5/12; C08L 33/08; C08L 33/10; C08L 33/12; C08L 47/00; C08L 71/00; C08L 71/02; C08L 75/04; C08L 75/06; C08L 75/08; C08L 75/10; C08F 30/08; C08F 130/08; C08F 230/08; C08G 18/837; C08G 63/914; C08G 63/916; C08G 65/336
See application file for complete search history.

(56) References Cited

U.S. PATENT DOCUMENTS

| | | | |
|---|---|---|---|
| 5,703,146 A | 12/1997 | Iwakiri et al. | |
| 2006/0205887 A1 | 9/2006 | Nakagawa et al. | |
| 2006/0270770 A1 | 11/2006 | Feng et al. | |
| 2008/0057317 A1 | 3/2008 | Kettner et al. | |
| 2011/0207886 A1 | 8/2011 | Wakabayashi et al. | |
| 2011/0232825 A1 | 9/2011 | Mack et al. | |
| 2011/0237723 A1* | 9/2011 | Yano | C08G 18/4854 524/141 |
| 2011/0308730 A1* | 12/2011 | Walther | C09J 175/04 156/329 |
| 2012/0196981 A1 | 8/2012 | Wakabayashi et al. | |
| 2013/0217828 A1 | 8/2013 | Miyafuji et al. | |
| 2013/0274410 A1 | 10/2013 | Miyafuji et al. | |

FOREIGN PATENT DOCUMENTS

| | | |
|---|---|---|
| EP | 2 267 083 A1 | 12/2010 |
| EP | 2388297 A1 | 11/2011 |
| JP | H05-202282 A | 8/1993 |
| JP | 2006-022169 A | 1/2006 |
| JP | 2006-131651 A | 5/2006 |
| JP | 2006-193603 A | 7/2006 |
| JP | 2008-542476 A | 11/2008 |
| JP | 2010-095704 A | 4/2010 |
| JP | 2010-209205 A | 9/2010 |
| JP | 2011-153192 A | 8/2011 |
| JP | 2012-511071 A | 5/2012 |
| JP | 2012-126881 A | 7/2012 |
| JP | 2013-534951 A | 9/2013 |
| WO | 2004/069923 A1 | 8/2004 |
| WO | 2008/027463 A1 | 3/2008 |
| WO | 2009/113538 A1 | 9/2009 |

OTHER PUBLICATIONS

Machine translation of JP 2006-193603 (no date).*
International Search Report issued in PCT/JP2015/056468, dated Jun. 9, 2015 (3 pages).
Written Opinion of the International Searching Authority issued in PCT/JP2015/056468, dated Jun. 9, 2015 (6 pages).
Extended European Search Report issued in European Application No. 15757889.9; dated Sep. 14, 2017 (7 pages).

* cited by examiner

*Primary Examiner* — Marc S Zimmer
(74) *Attorney, Agent, or Firm* — Osha Liang LLP

(57) ABSTRACT

A curable composition includes (A) an organic polymer having a reactive silyl group; (B) at least one ester compound (except for compounds having a methyl ester group) selected from the group consisting of isophthalic acid ester compounds, terephthalic acid ester compounds, 1,3-cyclohexanedicarboxylic acid ester compounds, and 1,4-cyclohexanedicarboxylic acid ester compounds; and (C) a compound having a methyl ester group.

14 Claims, No Drawings

CURABLE COMPOSITION

TECHNICAL FIELD

One or more embodiments of the invention relate to an organic polymer (more preferably, a polyoxyalkylene polymer) having a reactive silyl group, and a curable composition comprising the polymer.

BACKGROUND

A polyoxyalkylene polymer having a reactive silyl group is a polymer capable of reacting with water in the air at room temperature to be cured into a rubbery form, has already been produced industrially, and is widely used in applications such as sealants, adhesives, and paints.

In a curable composition comprising a polyoxyalkylene polymer having a reactive silyl group, a phthalic acid ester plasticizer is used for the purpose of improving the workability of the curable composition and for the purpose of adjusting the mechanical properties of a cured product (Patent Literature 1).

However, in recent years, the phthalic acid ester plasticizer is regarded as a substance suspected to have an endocrine-disrupting effect, and the effect of the phthalic acid ester plasticizer on the environment and the ecosystem is considered an issue, so that use of the phthalic acid ester plasticizer is limited.

Therefore, recently, a terephthalic acid ester plasticizer may be used as a substitute for the phthalic acid ester plasticizer (Patent Literature 2, Patent Literature 3).

In addition, a curable composition comprising, as a plasticizer, a methyl ester plasticizer such as dimethyl adipate is also known (Patent Literature 4, Patent Literature 5).

CITATION LIST

Patent Literature

Patent Literature 1: JP H05-202282 A
Patent Literature 2: WO 2008/027463 A
Patent Literature 3: JP 2006-193603 A
Patent Literature 4: WO 2004/069923 A
Patent Literature 5: JP 2006-131651 A

SUMMARY OF THE INVENTION

A one-component curable composition obtained by blending a phthalic acid ester plasticizer in a polyoxyalkylene polymer having a reactive silyl group may have insufficient depth curability, so that there is room for improvement. In addition, a curable composition obtained by blending a terephthalic acid ester plasticizer or an isophthalic acid plasticizer may have insufficient depth curability, and also may cause curing retardation when the curable composition is cured after storage. Thus, improvement of such a curable composition is desired. Meanwhile, in the case of a curable composition obtained by blending a compound having a methyl ester group such as dimethyl adipate, for example, a cured product thereof may be thinned, or may have insufficient tensile properties (tensile strength at break, elongation at break), so that further improvement of such a curable composition is desired in terms of these respects.

One or more embodiments disclosed herein, provide a curable composition that is applicable to a sealant and an adhesive by improving depth curability, curing retardation after storage, and tensile properties.

The present inventors have found that adding (C) a compound having a methyl ester group to a curable composition comprising (A) an organic polymer (more preferably, a polyoxyalkylene polymer) having a reactive silyl group and (B) at least one ester compound (except for compounds having a methyl ester group) selected from the group consisting of isophthalic acid ester compounds, terephthalic acid ester compounds, 1,3-cyclohexanedicarboxylic acid ester compounds, and 1,4-cyclohexanedicarboxylic acid ester compounds provide a curable composition that is applicable to a sealant and an adhesive by improving depth curability, curing retardation after storage, and tensile properties.

That is, one or more embodiments of the present invention relate to:

(1) A curable composition comprising: (A) an organic polymer having a reactive silyl group; (B) at least one ester compound (except for compounds having a methyl ester group) selected from the group consisting of isophthalic acid ester compounds, terephthalic acid ester compounds, 1,3-cyclohexanedicarboxylic acid ester compounds, and 1,4-cyclohexanedicarboxylic acid ester compounds; and (C) a compound having a methyl ester group.

(2) The curable composition according to the above (1), wherein the component (A) has a backbone structure which is at least one polymer selected from the group consisting of polyoxyalkylene polymers, saturated hydrocarbon polymers, and (meth)acrylate polymers.

(3) The curable composition according to the above (2), wherein the polyoxyalkylene polymers are polyoxypropylene polymers.

(4) The curable composition according to any one of the above (1) to (3), wherein the reactive silyl group of the component (A) is represented by formula (1):

$$-Si(R^1{}_{3-n})X_n \quad (1),$$

wherein $R^1$ represents an alkyl group having 1 to 20 carbon atoms, an aryl group having 6 to 20 carbon atoms, or an aralkyl group having 7 to 20 carbon atoms; when two or more $R^1$ groups are present, the $R^1$ groups may be the same or different from each other; X represents a hydroxyl group or a hydrolyzable group; when two or more Xs are present, the Xs may be the same or different from each other; and n represents an integer of 1 to 3.

(5) The curable composition according to any one of the above (1) to (4), wherein the reactive silyl group of the component (A) is represented by formula (2):

$$-SiR^1X_2 \quad (2),$$

wherein $R^1$ and X are the same as $R^1$ and X in formula (1).

(6) The curable composition according to any one of the above (1) to (5), wherein the reactive silyl group of the component (A) is a methyldimethoxysilyl group.

(7) The curable composition according to any one of the above (1) to (6), wherein the component (B) is represented by formula (3):

$$R^2OOC-P-COOR^3 \quad (3),$$

wherein $R^2$ and $R^3$ each independently represent a linear, branched, and/or alicyclic hydrocarbon group having 2 to 20 carbon atoms or a substituted and/or unsubstituted aromatic hydrocarbon group, and P represents a 1,3-phenylene group, a 1,4-phenylene group, a cyclohexane-1,3-diyl group, and/or a cyclohexane-1,4-diyl group.

(8) The curable composition according to any one of the above (1) to (7), wherein the component (B) is represented by formula (4):

$$R^2OOC—P^1—COOR^2 \quad (4)$$

wherein $R^2$ represents a linear and/or branched hydrocarbon group having 2 to 20 carbon atoms, and $P^1$ represents a 1,3-phenylene group and/or a 1,4-phenylene group.

(9) The curable composition according to any one of the above (1) to (8), wherein the component (C) has a molecular weight of 300 or lower.

(10) The curable composition according to any one of the above (1) to (9), wherein the component (C) is at least one compound selected from the group consisting of saturated aliphatic carboxylic acid methyl esters, unsaturated aliphatic carboxylic acid methyl esters, and aliphatic dicarboxylic acid dimethyl esters.

(11) The curable composition according to any one of the above (1) to (10), wherein the component (C) is an unsaturated aliphatic carboxylic acid methyl ester and/or an aliphatic dicarboxylic acid dimethyl ester.

(12) The curable composition according to any one of the above (1) to (11), further comprising a tetravalent organic tin compound as a curing catalyst for the component (A).

(13) The curable composition according to any one of the above (1) to (12), wherein the tetravalent organic tin compound is a dibutyltin compound and/or a dioctyltin compound.

(14) A one-component curable composition which is the curable composition according to any one of the above (1) to (13) as a one-component type.

(15) A sealant for which the curable composition according to any one of the above (1) to (14) is used.

(16) An adhesive for which the curable composition according to any one of the above (1) to (14) is used.

(17) A cured product obtained by curing the curable composition according to any one of the above (1) to (14).

The curable composition according to one or more embodiments of the present invention has excellent depth curability and is capable of improving curing retardation after storage and tensile properties.

DESCRIPTION OF EMBODIMENTS

Hereinafter, the present invention will be described in detail.

A reactive silyl group of (A) an organic polymer (more preferably, a polyoxyalkylene polymer) having a reactive silyl group, according to one or more embodiments of the present invention, is a group that has a hydroxy or hydrolyzable group bonded to a silicon atom and can undergo crosslinking through the formation of a siloxane bond.

The reactive silyl group is represented as a group represented by formula (1);

$$—SiR^1_{3-n}X_n \quad (1)$$

wherein each $R^1$ independently represents a substituted or unsubstituted alkyl group having 1 to 20 carbon atoms, an aryl group having 6 to 20 carbon atoms, or an aralkyl group having 7 to 20 carbon atoms, each X independently represents a hydroxy group or a hydrolyzable group, and n represents an integer of 1 to 3.

Examples of $R^1$ in formula (1) include substituted and/or unsubstituted alkyl groups such as a methyl group, an ethyl group, a methoxymethyl group, and a chloromethyl group; cycloalkyl groups such as a cyclohexyl group; aryl groups such as a phenyl group; and aralkyl groups such as a benzyl group. Among these, a methyl group and an ethyl group are preferred, and a methyl group is more preferred. The substituted alkyl groups include halogen-substituted alkyl groups such as a chloromethyl group; alkoxy-substituted alkyl groups such as a methoxymethyl group.

Examples of the hydrolyzable group include a hydrogen atom, a halogen atom, an alkoxy group, an acyloxy group, a ketoxymate group, an amino group, an amido group, an acid amido group, an aminooxy group, a mercapto group, and an alkenyloxy group. Among these, a hydrogen atom, an alkoxy group, an acyloxy group, a ketoxymate group, an amino group, an amido group, an aminooxy group, a mercapto group, and an alkenyloxy group are preferred. An alkoxy group is more preferred from the viewpoint of gentle hydrolyzability and ease in handling.

One to three hydrolyzable or hydroxy groups can be bonded to a single silicon atom. When two or more hydrolyzable or hydroxy groups are bonded in a reactive silyl group, these groups may be the same as or different from each other.

The numeral n in formula (1) is preferably 2 or 3 from the viewpoint of curability. When fast curability is required, n=3 is more preferred. When stability during storage is required, n=2 is more preferred.

Examples of the reactive silyl group include tri-$C_{1-3}$ alkoxysilyl groups such as a trimethoxysilyl group, a triethoxysilyl group, and a triisopropoxysilyl group; di-$C_{1-3}$ alkoxy mono-$C_{1-2}$ alkylsilyl groups such as a dimethoxymethylsilyl group, a diethoxymethylsilyl group, and a diisopropoxymethylsilyl group; and di-$C_{1-3}$ alkoxy-substituted $C_{1-2}$ alkylsilyl groups such as a (chloromethyl)dimethoxysilyl group and a (methoxymethyl)dimethoxysilyl group. In the case of achieving high activity and good curability, a trimethoxysilyl group, a triethoxysilyl group, and a dimethoxymethylsilyl group are more preferred, and a trimethoxysilyl group is particularly preferred. In the case of achieving good storage stability, a dimethoxymethylsilyl group and a triethoxysilyl group are particularly preferred. A triethoxysilyl group and a diethoxymethylsilyl group are particularly preferred, because the alcohol generated along with the hydrolysis reaction of these groups is ethanol and thus these groups have higher safety.

The backbone of (A) the organic polymer having a reactive silyl group used in one or more embodiments of the present invention is not particularly limited and may be any of organic polymers having various backbones. The resin forming the backbone is preferably, for example, at least one polymer selected from the group consisting of polyoxyalkylene polymers, olefin polymers, diene polymers, polyester polymers, vinyl polymers such as (meth)acrylate polymers, graft polymers, polysulfide polymers, polyamide polymers, diallyl phthalate polymers, and saturated hydrocarbon polymers, because the resulting composition has excellent curability and adhesion.

Specific examples thereof include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; olefin polymers such as ethylene-propylene copolymers; diene polymers such as polyisobutylene, copolymers of isobutylene and isoprene, polychloroprene, polyisoprene, copolymers of isoprene or butadiene with acrylonitrile and/or styrene, polybutadiene, and hydrogenated polyolefin polymers obtained by hydrogenation of these polyolefin polymers; polyester polymers obtained by condensation of a dibasic acid such as adipic acid and a glycol, or by ring-opening polymerization of lactones; vinyl polymers obtained by radical homopolymerization or copolymerization of (meth)acrylate monomers such as ethyl (meth)acrylate and butyl (meth)acrylate and vinyl monomers such as vinyl acetate, acrylonitrile, and styrene; graft polymers obtained by polymerization of vinyl monomers in the presence of the aforementioned polymers; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of ε-aminoundecanoic acid, nylon 12 produced by ring-opening polymerization of ε-aminolaurolactam, and copolymer nylons derived from at least two species of the aforementioned nylons; polycarbonate polymers formed by polycondensation of carbonyl chloride and bisphenols such as bisphenol A; diallyl phthalate polymers; and saturated hydrocarbon polymers such as hydrogenated polyisoprene and hydrogenated polybutadiene.

Among these, the backbone structure of the component (A) in one or more embodiments of the present invention is desirably at least one polymer selected from the group consisting of polyoxyalkylene polymers, saturated hydrocarbon polymers, and polymers of (meth)acrylate monomers (hereinafter, referred to as (meth)acrylate polymers), because these polymers have relatively low glass transition temperatures and give cured products having excellent cold resistance.

The glass transition temperature of the organic polymer (A) is not particularly limited, and is preferably 20° C. or lower, more preferably 0° C. or lower, and particularly preferably −20° C. or lower. The polymer with a glass transition temperature higher than 20° C. may have high viscosity in winter or in cold districts, resulting in poor workability. In addition, such a polymer may give a cured product with reduced flexibility and thus reduced elongation properties. The glass transition temperature values are measured by DSC.

Moreover, polyoxyalkylene polymers and (meth)acrylate polymers are particularly preferred because they have high moisture permeability, excellent depth curability in the case of being used in one-component compositions, and excellent adhesion. Polyoxyalkylene polymers are most preferred. Polyoxypropylene polymers are particularly preferred among the polyoxyalkylene polymers. The amount of the polyoxyalkylene polymers to be used per 100 parts by total weight of the component (A) is, for example, preferably not lower than 50% by weight, more preferably not lower than 70% by weight, further preferably not lower than 80% by weight, and particularly preferably not lower than 90% by weight. The upper limit is not particularly limited, however, is preferably not higher than 100% by weight, and may be not higher than 95% by weight.

Particularly, the backbone of (A) the polyoxyalkylene polymer having a reactive silyl group in one or more embodiments of the present invention has a repeating unit represented by formula (5):

$$—R^4—O— \quad (5)$$

wherein $R^4$ represents a linear or branched alkylene group having 1 to 14 carbon atoms.

Examples of formula (5) include —$CH_2O$—, —$CH_2CH_2O$—, —$CH_2CH(CH_3)O$—, —$CH_2CH(C_2H_5)O$—, —$CH_2C(CH_3)_2O$—, and —$CH_2CH_2CH_2CH_2O$—.

The backbone of the component (A) may be formed of just one species of repeating unit or may be formed of two or more species of repeating units. In applications such as sealants or adhesives, the component (A) is preferably formed of a polymer comprising at least 80% by weight, more preferably at least 90% by weight, of a propylene oxide unit, because the polymer is noncrystalline and has a relatively low viscosity.

The method for producing a polyoxyalkylene polymer for forming a backbone of (A) component may include a polymerization method using an alkali catalyst such as KOH; a polymerization method using a transition metal compound-porphyrin complex catalyst such as a complex obtained by the reaction between an organoaluminum compound and a porphyrin, as disclosed in JP-A S61-215623; a polymerization method using a double metal cyanide complex catalyst, as disclosed in, for example, JP-B S46-27250, JP-B S59-15336, and U.S. Pat. Nos. 3,278,457, 3,278,458, 3,278,459, 3,427,256, 3,427,334 and 3,427,335; a polymerization method using a catalyst containing a polyphosphazene salt, as disclosed in JP-A H10-273512; and a polymerization method using a catalyst containing a phosphazene compound, as disclosed in JP-A H11-060722.

Among these, the polymerization method in which an alkylene oxide is reacted using an initiator in the presence of a double metal cyanide complex catalyst is preferred, because a polymer having a narrow molecular weight distribution is obtained thereby.

Examples of the double metal cyanide complex catalyst include $Zn_3[Co(CN)_6]_2$ (zinc hexacyanocobaltate complex). In addition, a catalyst in which an alcohol and/or an ether is coordinated as an organic ligand may also be used.

As the initiator, a compound comprising at least two active hydrogen groups is preferred. Examples of the active hydrogen-comprising compound include polyalcohols such as ethylene glycol, diethylene glycol, propylene glycol, and glycerin; and linear and/or branched polyether compounds having a number average molecular weight of 500 to 20,000.

Examples of the alkylene oxide include ethylene oxide, propylene oxide, and isobutylene oxide.

The reactive silyl group may be introduced into the backbone of the component (A) by a publicly known method. For example, the following methods can be exemplified.

(Method I): A polymer comprising a functional group such as a hydroxy group within the molecule is allowed to react with a compound comprising an unsaturated group and an active group that is reactive with the functional group of the polymer to provide an unsaturated group-containing polymer. Alternatively, the functional group-containing organic polymer is allowed to copolymerize with an unsaturated group-containing epoxy compound to provide an unsaturated group-containing polymer. Then, the unsaturated group of the provided unsaturated group-containing polymer is allowed to react with a reactive silyl group-containing hydrosilane for hydrosilylation.

Examples of the compound comprising an unsaturated group and an active group exhibiting reactivity, which is used in the method I include allyl chloride and methallyl chloride.

Examples of the hydrosilane compound used in the method I include halogenated silanes such as trichlorosilane, methyldichlorosilane, dimethylchlorosilane, phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxysilanes such as methyldiacetoxysilane and phenyldiacetoxysilane; and ketoxymatesilanes such as bis(dimethylketoxymate)methylsilane and bis(cyclohexylketoxymate)methylsilane.

Among these, halogenated silanes and alkoxysilanes are more preferred, and alkoxysilanes are most preferred because resulting curable compositions have gentle hydrolyzability and are easily handled.

Among alkoxysilanes, methyldimethoxysilane is particularly preferred, because of its easy availability and also because the curable composition comprising the resulting polymer has good curability, good storage stability, good elongation properties, and good tensile strength. In addition, trimethoxysilane is more preferred from the viewpoint of curability and recovery of the resulting curable composition.

(Method II): The unsaturated group of an unsaturated group-comprising polymer obtained in the same manner as in the method I is allowed to react with a compound comprising a mercapto group and a reactive silyl group, in the presence of a radical initiator and/or a radical generation source, for introduction.

Examples of the compound comprising a mercapto group and a reactive silyl group include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

(Method III): A polymer comprising a functional group such as a hydroxy group, an epoxy group, or an isocyanate group within the molecule is allowed to react with a compound comprising a reactive silyl group and a functional group that is reactive with the functional group of the polymer.

Examples of the method III in which a hydroxy group-terminated polymer is allowed to react with a compound comprising an isocyanate group and a reactive silyl group include a method as disclosed in JP H03-47825 A.

Examples of the compound comprising an isocyanate group and a reactive silyl group include γ-isocyanatepropyltrimethoxysilane, γ-isocyanatepropylmethyldimethoxysilane, γ-isocyanatepropyltriethoxysilane, γ-isocyanatepropylmethyldiethoxysilane, isocyanatemethyltrimethoxysilane, isocyanatemethyltriethoxysilane, isocyanatemethyldimethoxymethylsilane, and isocyanatemethyldiethoxymethylsilane.

In the case of using a silane compound in which three hydrolyzable groups are bonded to one silicon atom, such as trimethoxysilane, disproportionation may proceed. As the disproportionation proceeds, unstable compounds such as dimethoxysilane may be generated, making it difficult to handle. In the case of using γ-mercaptopropyltrimethoxysilane or γ-isocyanatepropyltrimethoxysilane, however, such disproportionation will not proceed. Thus, the method II or III is more preferably used in the case where a group in which three hydrolyzable groups such as trimethoxysilyl groups are bonded to one silicon atom is used as the silyl group.

Among the above methods, the method I or III in which a hydroxy group-terminated polymer is allowed to react with a compound comprising an isocyanate group and a reactive silyl group is preferred, because a high inversion rate is achieved in a relatively short reaction time. Furthermore, the polymer obtained by the method I is more preferred because a curable composition having a lower viscosity and better workability can be obtained when this polymer is used than when the polymer obtained by the method III is used. In addition, the method I is most preferred because the polymer obtained by the method II has a strong odor due to mercaptosilane.

The method for producing the (A) component may include methods disclosed in JP-B S45-36319, JP-B S46-12154, JP-A S50-156599, JP-A S54-6096, JP-A S55-13767, JP-A 555-13468, JP-A S57-164123, JP-B H03-2450, U.S. Pat. No. 3,632,557, U.S. Pat. No. 4,345,053, U.S. Pat. No. 4,366,307, and U.S. Pat. No. 4,960,844, and other documents, as well as methods disclosed in JP-A S61-197631, JP-A S61-215622, JP-A S61-215623, JP-A S61-218632, JP-A H03-72527, JP-A H03-47825, and JP-A H08-231707, which can provide polyoxyalkylene polymers with high molecular weight and narrow molecular weight distribution, i.e., with a number average molecular weight of 6,000 or higher and an Mw/Mn of 1.6 or less. As these polyoxyalkylene polymers having a reactive silyl group, a single polymer may be used, or two or more polymers may be used in combination.

The number average molecular weight (the polystyrene-equivalent molecular weight measured by GPC) of the component (A) is preferably 6,000 to 50,000, more preferably 10,000 to 40,000, further preferably 10,000 to 30,000, and particularly preferably 10,000 to 25,000. If the number average molecular weight is less than 6,000, the properties of elongation at break of the resulting cured product tend to be insufficient. If the number average molecular weight exceeds 50,000, the curing rate of the curable composition tends to decrease or the workability of the curable composition tends to deteriorate.

The number average molecular weight of the component (A) can be obtained as a molecular weight (terminal group molecular weight) corresponding to a number average molecular weight, of a polymer precursor prior to reactive silyl group introduction, obtained by titrimetric analysis based on the hydroxyl value measuring method of JIS K 1557 and the iodine value measuring method specified in JIS K 0070. In addition, the number average molecular weight of the component (A) can also be obtained as a polystyrene-equivalent molecular weight obtained by GPC measurement (molecular weight based on GPC).

The number of reactive silyl groups in the component (A) per molecule of the polymer on average is preferably 1 to 6, more preferably 1.3 to 4, further preferably 1.4 to 3, and most preferably 1.4 to 2. If the number of reactive silyl groups on average is less than 1, the degree of curing of the composition tends to be insufficient or the tensile strength at break of the cured product tends to be insufficient. On the other hand, if the number of reactive silyl groups on average exceeds 6, the elongation at break of the cured product tends to be insufficient.

One or a plurality of reactive silyl groups may be introduced to one molecular terminal of the component (A). From the viewpoint of achieving both desired elongation properties and desired strength properties of the resulting cured product, one or two reactive silyl groups are more preferably introduced to one molecular terminal, and one reactive silyl group is most preferably introduced to one molecular terminal.

The average number of reactive silyl groups in the component (A) can be obtained as an average number obtained by a method in which the proton on the carbon to which the reactive silyl group is directly bonded is quantified by a $^1$H-NMR measurement method. In calculation of the average number of reactive silyl groups in the polymer in one or more embodiments of the present invention, when the reactive silyl group is introduced to a precursor polymer, a precursor polymer to which the reactive silyl group has not been introduced and a polymer obtained by side reaction are also regarded as a part of the component (A) having the same backbone structure, and are included in a modulus (the number of molecules) used for calculating the average number of reactive silyl groups in one molecule.

The reactive silyl group of the component (A) may be present as a side-chain within the molecular chain, or may be present at a terminal of the molecular chain. In applications such as sealants or adhesives, the reactive silyl group is more preferably present at a terminal of the molecular chain.

The molecular weight distribution (Mw/Mn) of the component (A) is preferably narrow from the viewpoint of decreasing the viscosity of the resulting composition, and is preferably not higher than 1.6, more preferably not higher than 1.5, and particularly preferably not higher than 1.4.

The backbone structure of the component (A) may be linear or may have a branched chain. In the case of obtaining a cured product having excellent elongation properties, the backbone structure of the component (A) is preferably linear. In the case of obtaining a cured product having excellent strength, the backbone structure of the component (A) preferably has a branched chain. When the backbone structure of the component (A) has a branched chain, the number of branched chains is preferably 1 to 4 and most preferably 1, from the viewpoint of the availability of the material and the strength and the elongation properties of the cured product.

As the component (A), a single component may be used, or two or more components may be used in combination.

In one or more embodiments of the curable composition of the invention of the present application, as the component (A), it is also possible to use a polymer that has a reactive silyl group represented by formula (1) and a repeating unit represented by formula (4) and further has, in the backbone or at a moiety at which the reactive silyl group is bonded to the backbone, at least one binding group selected from —N(R$^0$)—C(=O)—, —N(R$^0$)—C(=O)—N(R$^0$)—, and/or —N(R$^0$)—COO— (R$^0$ represents a hydrogen or an organic group). Examples of such a polymer include polymers generally referred to as silylated polyurethanes, and SPUR, etc.

In one or more embodiments of the curable composition of the present invention, a plasticizer may be used for the purposes of adjustment of the viscosity and improvement of the workability of the curable composition and adjustment of mechanical properties such as the hardness, the tensile strength, and the elongation of a cured product obtained by curing the curable composition. As such a plasticizer, (B) at least one ester compound (except for compounds having a methyl ester group) selected from the group consisting of isophthalic acid ester compounds, terephthalic acid ester compounds, 1,3-cyclohexanedicarboxylic acid ester compounds, and 1,4-cyclohexanedicarboxylic acid ester compounds is preferably used, because the burden on the environment can be reduced and equal mechanical properties are obtained as compared to phthalic acid ester plasticizers. Particularly, isophthalic acid ester compounds and terephthalic acid ester compounds are preferred.

In the present application, the term "phthalic acid" refers to a benzene dicarboxylic acid having a carboxyl group at ortho position (a phthalic acid in a narrow sense), and the term "phthalate" refers to a generic term for ester compounds of benzene dicarboxylic acids having a carboxyl group at ortho position.

The component (B) may be represented by the following formula (3).

wherein R$^2$ and R$^3$ each independently represent a linear, branched, and/or alicyclic hydrocarbon group having 2 to 20 carbon atoms or a substituted and/or unsubstituted aromatic hydrocarbon group, and P represents a 1,3-phenylene group, a 1,4-phenylene group, a cyclohexane-1,3-diyl group, and/or a cyclohexane-1,4-diyl group. Examples of R$^2$ and R$^3$ each independently include an ethyl group, an n-propyl group, an isopropyl group, an n-butyl group, an isobutyl group, a tert-butyl group, an n-pentyl group, an isopentyl group, a neopentyl group, an n-hexyl group, an n-heptyl group, an isoheptyl group, an n-octyl group, an isooctyl group, a 2-ethylhexyl group, an isodecyl group, an isononyl group, a cyclohexyl group, a phenyl group, and a benzyl group. R$^2$ and R$^3$ are each preferably a branched aliphatic hydrocarbon group, more preferably a branched hydrocarbon group having 5 to 20 carbon atoms, and further preferably a branched hydrocarbon group having 6 to 15 carbon atoms.

Furthermore, the component (B) is more preferably a component represented by the following formula (4) from the viewpoint of availability.

wherein R$^2$ represents a linear and/or branched hydrocarbon group having 2 to 20 carbon atoms, and P$^1$ represents a 1,3-phenylene group and/or a 1,4-phenylene group.

Examples of R$^2$ used in formula (4) include groups selected from groups corresponding to the linear and/or branched hydrocarbon groups exemplified for R$^2$ in formula (3), and specifically include an ethyl group, an n-propyl group, an isopropyl group, an n-butyl group, an isobutyl group, a tert-butyl group, an n-pentyl group, an isopentyl group, a neopentyl group, an n-hexyl group, an n-octyl group, an isooctyl group, a 2-ethylhexyl group, an n-nonyl group, an isononyl group, and an isodecyl group. Preferred R$^2$ is the same as in the case of formula (3).

Examples of the component (B) include the following compounds.

Examples of isophthalic acid ester compounds include diethyl isophthalate, di-n-butyl isophthalate, diisobutyl isophthalate, di-n-hexyl isophthalate, di-n-octyl isophthalate, diisooctyl isophthalate, bis(2-ethylhexyl)isophthalate (available as trade name DOIP manufactured by CG Ester Corporation), di-n-nonyl isophthalate, diisononyl isophthalate, and diisodecyl isophthalate.

Examples of terephthalic acid ester compounds include diethyl terephthalate, di-n-butyl terephthalate, diisobutyl terephthalate, di-n-hexyl terephthalate, di-n-octyl terephthalate, diisooctyl terephthalate, bis(2-ethylhexyl)terephthalate (available as trade name EASTMAN 168 manufactured by Eastman Chemical Company), di-n-nonyl terephthalate, diisononyl terephthalate, and diisodecyl terephthalate.

Examples of 1,3-cyclohexanedicarboxylic acid ester compounds include diethyl 1,3-cyclohexanedicarboxylate, di-n-butyl 1,3-cyclohexanedicarboxylate, diisobutyl 1,3-cyclohexanedicarboxylate, di-n-hexyl 1,3-cyclohexanedicarboxylate, di-n-octyl 1,3-cyclohexanedicarboxylate, diisooctyl 1,3-cyclohexanedicarboxylate, bis(2-ethylhexyl)1,3-cyclohexanedicarboxylate, di-n-nonyl 1,3-cyclohexanedicarboxylate, diisononyl 1,3-cyclohexanedicarboxylate, and diisodecyl 1,3-cyclohexanedicarboxylate.

Examples of 1,4-cyclohexanedicarboxylic acid ester compounds include diethyl 1,4-cyclohexanedicarboxylate, di-n-butyl 1,4-cyclohexanedicarboxylate, diisobutyl 1,4-cyclohexanedicarboxylate, di-n-hexyl 1,4-cyclohexanedicarboxylate, di-n-octyl 1,4- cyclohexanedicarboxylate, diisooctyl 1,4-cyclohexanedicarboxylate, bis(2-ethylhexyl)1,4-cyclohexanedicarboxylate, di-n-nonyl 1,4-cyclohexanedicarboxylate, diisononyl 1,4-cyclohexanedicarboxylate, and diisodecyl 1,4-cyclohexane dicarboxylate.

Among these, bis(2-ethylhexyl)isophthalate and bis(2-ethylhexyl)terephthalate are particularly preferred from the viewpoint of availability. In addition, terephthalic acid ester compounds are preferred from the viewpoint of depth curability.

As the component (B), a single component may be used, or two or more components may be used in combination.

The amount of the component (B) to be used per 100 parts by weight of the component (A) is preferably 5 to 150 parts by weight, more preferably 10 to 120 parts by weight, further preferably 15 to 110 parts by weight, and particularly preferably 20 to 100 parts by weight. If the amount is less than 5 parts by weight, the effect as a plasticizer is not exerted. If the amount exceeds 150 parts by weight, the cured product has insufficient mechanical strength.

In one or more embodiments of the present invention, a curable composition comprising the component (A) and the component (B) may have insufficient depth curability. In addition, when the curable composition is cured after storage, curing retardation may occur. As a result of examination, the present inventors have found that it is effective to use (C) a compound having a methyl ester group, for improving the depth curability and the curing retardation after storage. In addition, with a curable compound having the component (A) and the component (C), the tensile properties of the cured product are not sufficiently exerted. As a result of examination, the present inventors have found that the effects such as the above tensile properties are improved by using this curable compound in combination of the component (B).

Examples of the component (C) include (C-1) a compound that is not a polymer and has a methyl ester group or (C-2) a polymer having a methyl ester group. The number of methyl ester groups per molecule is, for example, 1 to 4, preferably 1 to 3, and more preferably 1 to 2.

The molecular weight of the component (C-1) is preferably not higher than 1,000, more preferably 60 to 750, further preferably 100 to 500, and most preferably 100 to 300.

Examples of the component (C-1) include saturated aliphatic carboxylic acid methyl esters, unsaturated aliphatic carboxylic acid methyl esters, aliphatic dicarboxylic acid dimethyl esters, aromatic carboxylic acid methyl esters, and aromatic dicarboxylic acid monomethyl or dimethyl esters.

Examples of saturated aliphatic carboxylic acid methyl esters include methyl formate, methyl acetate, methyl propanoate, methyl butanoate, methyl n-pentanoate, methyl isopentanoate, methyl neopentanoate, methyl octanoate, methyl decanoate, methyl dodecanoate, methyl tetradecanoate, methyl hexadecanoate, methyl octadecanoate, and methyl cyclohexanecarboxylate.

Examples of unsaturated aliphatic carboxylic acid methyl esters include methyl acrylate, methyl methacrylate, methyl oleate, methyl linoleate, methyl ricinoleate, methyl O-acetyl ricinoleate, and a mixture of methyl oleate (a molecular weight of 296.49) and methyl linoleate (a molecular weight of 294.47) (available as trade name TFE-MED manufactured by Tsuno Food Industrial Co., Ltd.), and include unsaturated fatty acid methyl esters having preferably about 4 to 17 carbon atoms and more preferably about 10 to 17 carbon atoms.

Examples of aliphatic dicarboxylic acid dimethyl esters include dimethyl malonate, dimethyl succinate, dimethyl glutarate, dimethyl adipate, and dimethyl sebacate, and include dimethyl esters of linear aliphatic-$\alpha,\omega$-dicarboxylic acids having preferably about 3 to 10 carbon atoms, more preferably about 4 to 8 carbon atoms, and most preferably about 5 to 7 carbon atoms.

Examples of aromatic carboxylic acid methyl esters include methyl benzoate.

Examples of aromatic dicarboxylic acid monomethyl or dimethyl ester include dimethyl phthalate, dimethyl isophthalate, dimethyl terephthalate, dimethyl 2-methylterephthalate, and (2-ethylhexyl)methyl terephthalate.

Examples of the component (C-2) include polymers and/or copolymers comprising, as its constitutional unit, a monomer such as methyl (meth)acrylate, methyl ester-substituted styrene, dimethyl maleate, methylethyl maleate, dimethyl fumarate, or methylethyl fumarate.

In the case where the component (C-2) is a copolymer comprising methyl (meth)acrylate as its constitutional unit, the component (C-2) may contain a constitutional unit other than methyl (meth)acrylate.

Examples of the constitutional unit other than methyl (meth)acrylate include alkyl (having 2 or more carbon atoms) (meth)acrylates and/or polymerizable monomers such as vinyl monomers.

Examples of alkyl (having 2 or more carbon atoms) (meth)acrylates include ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 3-(meth)acryloyloxypropyltrimethoxysilane, 3-(meth)acryloyloxypropylmethyldimethoxysilane, 3-(meth)acryloyloxypropyltriethoxysilane, 3-(meth)acryloyloxypropylmethyldiethoxysilane, (meth)acryloyloxymethyltrimethoxysilane, (meth)acryloyloxymethylmethyldimethoxysilane, (meth)acryloyloxymethyltriethoxysilane, (meth)acryloyloxymethylmethyldiethoxysilane, 2-aminoethyl (meth)acrylate, and ethylene oxide adducts of (meth)acrylic acid.

Examples of vinyl monomers include (meth)acrylic acid; styrene monomers such as styrene, vinyltoluene, $\alpha$-methylstyrene, chlorostyrene, and styrenesulfonic acid and salts thereof; silicon-containing vinyl monomers such as vinyltrimethoxysilane and vinyltriethoxysilane; maleic anhydride, maleic acid, and monoalkyl or dialkyl esters of maleic acid; fumaric acid, and monoalkyl or dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; carboxylic acid vinyl esters such as vinyl acetate, vinyl propionate, vinyl neopentanoate, vinyl benzoate, and vinyl 3-phenylacrylate; alkene compounds such as ethylene and propylene; conjugated diene compounds such as butadiene and isoprene; and vinyl chloride, vinylidene chloride, allyl chloride, and allyl alcohol.

In the above, (meth)acrylic acid means acrylic acid and/or methacrylic acid.

As a polymerization method for obtaining the component (C-2), publicly known polymerization methods of various types of control radical polymerization, etc. can be used, such as general free radical polymerization; free radical polymerization using a chain transfer agent such as a compound having a mercapto group; continuous polymerization under high temperature and high pressure as disclosed in JP-A S57-502171, JP-A S59-6207, JP-A S60-215007, or JP-A H10-511992, etc.; atom transfer radical polymerization as disclosed in WO 96/30421, WO 97/18247, WO 98/01480, WO 98/40415, JP-A H09-208616, or JP-A H08-41117, etc.

The number average molecular weight (polystyrene-equivalent molecular weight measured by GPC) of the component (C-2) is preferably 500 to 50,0000, more preferably 1,000 to 10,000, and particularly preferably 1,000 to 8,000.

In the case where the component (C) is a low-molecular-weight compound, the viscosity is generally low. Thus, the molecular weight of the component (C) is preferably 100 to 300 from the viewpoint of the workability of the curable composition.

As the component (C), a single component may be used, or two or more components may be used in combination.

From the viewpoint of the effect of improving depth curability and curing retardation after storage, the component (C-1) is preferably used, at least one compound having a methyl ester group and selected from saturated aliphatic carboxylic acid methyl esters, unsaturated aliphatic carboxylic acid methyl esters, and aliphatic dicarboxylic acid dimethyl esters is more preferably used, and unsaturated aliphatic carboxylic acid methyl esters and/or aliphatic dicarboxylic acid dimethyl esters are most preferably used. In addition, from the viewpoint of adhesion, unsaturated aliphatic carboxylic acid methyl esters are most preferred.

The amount of the component (C) to be used per 100 parts by weight of the component (A) is preferably 5 to 150 parts by weight, more preferably 10 to 120 parts by weight, further preferably 15 to 110 parts by weight, and particularly preferably 20 to 100 parts by weight. If the amount is less than 5 parts by weight, the effect of improving depth curability and curing retardation after storage is not exerted. If the amount exceeds 150 parts by weight, the cured product has insufficient mechanical strength.

The component (C) may serve as a plasticizer in the curable composition of one or more embodiments of the present invention. Thus, the total amount of the component (B) and the component (C) to be used per 100 parts by weight of the component (A) is preferably 5 to 150 parts by weight, more preferably 10 to 120 parts by weight, further preferably 15 to 110 parts by weight, and particularly preferably 20 to 100 parts by weight.

The ratio (% by weight) between the component (B) and the component (C) is preferably 5/95 to 95/5, more preferably 55/45 to 90/10, and most preferably 65/35 to 85/15.

When the component (C) having a low boiling point such as dimethyl adipate is used in a large amount, the cured product may be thinned. In addition, aliphatic carboxylic acid methyl esters or aliphatic dicarboxylic acid dimethyl esters may provide inferior weather resistance. Thus, regarding the ratio between the component (B) and the component (C), the amount of the component (B) is more preferably larger.

In one or more embodiments of the curable composition of the present invention, a plasticizer other than the component (B) or the component (C) may be used.

Examples of the plasticizer other than the component (B) or the component (C) include phthalates such as dibutyl phthalate, diisononyl phthalate (DINP), diisooctyl phthalate, di(2-ethylhexyl) phthalate, di-n-octyl phthalate, diisodecyl phthalate (DIDP), and butyl benzyl phthalate; non-phthalic esters such as diisononyl 1,2-cyclohexanedicarboxylate (available as trade name Hexamoll DINCH manufactured by BASF SE); aliphatic polycarboxylates such as dioctyl adipate, dioctyl sebacate, dibutyl sebacate, diisodecyl succinate, and tributyl acetylcitrate; unsaturated fatty acid esters such as butyl oleate; alkyl sulfonic acid phenyl esters (available as trade name Mesamoll manufactured by LANXESS AG); phosphates such as tricresyl phosphate and tributyl phosphate; trimellitates; chlorinated paraffins; hydrocarbon oils such as alkyl diphenyls and partially hydrogenated terphenyls; process oils; and epoxy plasticizers such as epoxidized soybean oil and benzyl epoxystearate.

In addition, a high-molecular-weight plasticizer may also be used. When a high-molecular-weight plasticizer is used, initial physical properties can be maintained over a long period of time as compared to the case where a low-molecular-weight plasticizer is used. Furthermore, the drying properties (coating properties) when an alkyd coating material is applied to the resulting cured product can be improved.

Examples of the high-molecular-weight plasticizer include vinyl polymers obtained by polymerizing vinyl monomers by various methods; ester compounds of polyalkylene glycols, such as diethylene glycol dibenzoate, triethylene glycol dibenzoate, and pentaerythritol esters; polyester plasticizers prepared from dibasic acids, such as sebacic acid, adipic acid, azelaic acid, and phthalic acid, and divalent alcohols, such as ethylene glycol, diethylene glycol, triethylene glycol, propylene glycol, and dipropylene glycol; polyether compounds such as polyether polyol having a number average molecular weight of 500 or higher and further 1,000 or higher, such as polyethylene glycol, polypropylene glycol, polytetramethylene glycol, and derivatives obtained by converting the hydroxy groups of these polyether polyols into ester groups, ether groups or other groups; polystyrene plasticizers such as polystyrene and poly-α-methylstyrene; polybutadiene, polybutene, polyisobutylene, polybutadiene-acrylonitrile, and polychloroprene.

Among these high-molecular-weight plasticizers, those that are compatible with the component (A) are preferred. From this viewpoint, polyethers and vinyl polymers are preferred. In addition, it is preferred if a polyether is blended as a plasticizer, because the surface curability and depth curability are improved. Among these, polypropylene glycol is more preferred. Moreover, from the viewpoint of compatibility, weather resistance, and heat resistance, vinyl polymers are preferred. Among the vinyl polymers, acrylic polymers and/or methacrylic polymers are preferred, acrylic polymers such as polyalkyl acrylates are more preferred. For synthesis of these polymers, a living radical polymerization method is preferred, and an atom transfer radical polymerization method is more preferred, because these methods can provide a narrow molecular weight distribution and can decrease a lower viscosity. In addition, a polymer is preferably used which is obtained by the SGO process including continuous bulk polymerization of an alkyl acrylate monomer at high temperature and high pressure, as disclosed in JP-A 2001-207157.

The number average molecular weight of the high-molecular-weight plasticizer is preferably 500 to 15,000, more preferably 800 to 10,000, further preferably 1,000 to 8,000, particularly preferably 1,000 to 5,000, and most preferably 1,000 to 3,000. If the number average molecular weight is less than 500, the plasticizer bleeds out over time due to heat or rain, so that initial physical properties cannot be maintained over a long period of time. In addition, if the number average molecular weight exceeds 15,000, the viscosity increases, so that workability deteriorates.

The molecular weight distribution (Mw/Mn) of the high-molecular-weight plasticizer is not particularly limited, but is preferably narrow, and is preferably less than 1.80, more preferably not higher than 1.60, further preferably not higher than 1.50, particularly preferably not higher than 1.40, and most preferably not higher than 1.30.

The number average molecular weight of the high-molecular-weight plasticizer is measured by GPC in the case where the high-molecular-weight plasticizer is a vinyl polymer, and is measured by terminal group analysis in the case where the high-molecular-weight plasticizer is a polyether polymer. In addition, the molecular weight distribution is measured by GPC (relative to polystyrene standards).

The high-molecular-weight plasticizer may have or may not have a reactive silyl group. In the case where the high-molecular-weight plasticizer has a reactive silyl group, the high-molecular-weight plasticizer serves as a reactive plasticizer, and thus transfer of the plasticizer from the cured product can be prevented. In the case where the high-molecular-weight plasticizer has a reactive silyl group, the number of reactive silyl groups per molecule on average is preferably not greater than 1 and further preferably not greater than 0.8.

As the plasticizer other than the component (B) or the component (C), a single plasticizer may be used, or two or more plasticizers may be used in combination.

The amount of the plasticizer other than the component (B) or the component (C), to be used per 100 parts by weight of the component (A), may be 0 to 4 parts by weight and particularly 0 parts by weight, but is preferably 5 to 150 parts by weight, more preferably 10 to 120 parts by weight, further preferably 15 to 110 parts by weight, and particularly preferably 20 to 100 parts by weight. Furthermore, the amount of all the plasticizers (the total amount of the component (B), the component (C), and the plasticizer other than the component (B) and the component (C)) per 100 parts by weight of the component (A) is preferably 5 to 150 parts by weight, more preferably 10 to 120 parts by weight, further preferably 15 to 110 parts by weight, and particularly preferably 20 to 100 parts by weight.

In one or more embodiments of the curable composition of the present invention, a curing catalyst may be used for the purpose of accelerating curing of the component (A).

Examples of the curing catalyst include tetravalent organic tin compounds, carboxylic acids, carboxylic acid metal salts, amine compounds, and metal compounds other than tin.

Examples of tetravalent organic tin compounds include dimethyltin compounds, dibutyltin compounds, and dioctyltin compounds.

Examples of dimethyltin compounds include dimethyltin diacetate and dimethyltin bis(acetylacetonate).

Examples of dibutyltin compounds include dibutyltin dilaurate, dibutyltin diacetate, dibutyltin bis(2-ethylhexanoate), dibutyltin dioctanoate, dibutyltin phthalate, dibutyltin maleate, dibutyltin bis(methyl maleate), dibutyltin bis(ethyl maleate), dibutyltin bis(butyl maleate), dibutyltin bis(n-octyl maleate), dibutyltin bis(isooctyl maleate), dibutyltin bis(tridecyl maleate), dibutyltin bis(benzyl maleate), dibutyltin dimethoxide, dibutyltin diphenoxide, dibutyltin bis (nonylphenoxide), dibutyltin bis(acetylacetonate), dibutyltin bis(ethyl acetoacetate), dibutyltin bis-triethoxysilicate, and reaction products of dibutyltin oxide and ester compounds such as dioctyl phthalate, diisodecyl phthalate, and methyl maleate.

Examples of dioctyltin compounds include dioctyltin diacetate, dioctyltin distearate, dioctyltin dilaurate, dioctyltin bis(ethyl maleate), dioctyltin bis(n-octyl maleate), dioctyltin bis(isooctyl maleate), dioctyltin bis(acetylacetonate), dioctyltin bis-triethoxysilicate, and reaction products of dioctyltin oxide and ester compounds such as dioctyl phthalate, diisodecyl phthalate, and methyl maleate.

Examples of carboxylic acids include 2-ethylhexanoic acid and versatic acid.

Examples of carboxylic acid metal salts include bivalent tin carboxylates such as tin octylate, tin 2-ethylhexanoate, tin naphthenate, tin stearate, tin versaticate, and tin neodecanoate; and lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, and iron carboxylate. In addition, examples of carboxylic acid metal salts include reaction products and/or mixtures of bivalent tin carboxylates and amine compounds such as laurylamine.

Examples of amine compounds include laurylamine, diethylaminopropylamine, 1-(o-tolyl)biguanide, guanidine, 1-phenylguanidine, diphenylguanidine, and 1,8-diazabicyclo(5,4,0)undecene-7 (DBU).

Examples of metal compounds other than tin include titanium compounds such as tetrabutyl titanate, tetrapropyl titanate, titanium tetrakis(acetylacetonate), diisopropoxytitanium bis(acetylacetonate), and diisopropoxytitanium bis (ethyl acetoacetate); organoaluminum compounds such as aluminum tris(acetylacetonate), aluminum tris(ethyl acetoacetate), and diisopropoxyaluminum ethyl acetoacetate; and zirconium compounds such as zirconium tetrakis (acetylacetonate).

As the curing catalyst, a single catalyst may be used, or two or more catalysts may be used in combination.

As the curing catalyst, tetravalent organic tin compounds are preferred, and dibutyltin compounds and dioctyltin compounds are more preferred because desired strength is achieved quickly.

The amount of the curing catalyst to be used per 100 parts by weight of the component (A) is preferably 0.05 to 20 parts by weight, more preferably 1 to 10 parts by weight, further preferably 1 to 7 parts by weight, and most preferably 1.5 to 5 parts by weight. If the amount is less than 0.05 parts by weight, the curing rate tends to decrease. On the other hand, if the amount exceeds 20 parts by weight, the curing rate excessively increases, so that a favorable cured product cannot be obtained.

A filler may be used in one or more embodiments of the curable composition of the present invention. Examples of the filler include reinforcing fillers such as fumed silica, precipitated silica, crystalline silica, fused silica, dolomite, silicic anhydride, hydrous silicic acid, and carbon black; fillers such as ground calcium carbonate, colloidal calcium carbonate, magnesium carbonate, diatomite, calcined clay, clay, talc, titanium oxide, bentonite, organobentonite, ferric oxide, fine aluminum powder, flint powder, zinc oxide, activated zinc white, shirasu balloons, glass microballoons, organic microballoons of phenolic resin and vinylidene chloride resin, etc., and resin powders such as PVC powder and PMMA powder; and fibrous fillers such as glass fiber and filaments. The amount of the filler to be used per 100 parts by weight of the polymer of the component (A) is preferably 1 to 250 parts by weight and more preferably 10 to 200 parts by weight.

In the case of using the filler in order to obtain a high-strength cured product, the filler selected mainly from, for example, fumed silica, precipitated silica, crystalline silica, fused silica, dolomite, silicic anhydride, hydrous silicic acid, carbon black, surface-treated calcium carbonate, calcined clay, clay, and activated zinc white is used in an amount of preferably 1 to 250 parts by weight and more preferably 10 to 200 parts by weight, per 100 parts by weight of the component (A).

In the case of obtaining a cured product having low strength and high elongation at break, the filler selected mainly from, for example, titanium oxide, ground calcium carbonate, magnesium carbonate, talc, ferric oxide, zinc oxide, and shirasu balloons, is used preferably in an amount of 5 to 200 parts by weight per 100 parts by weight of the component (A).

In general, calcium carbonate with a greater specific surface area is more effective in improving the tensile strength at break, elongation at break, and adhesion of the cured product. As a matter of course, these fillers may be used alone or two or more of these fillers may be used in admixture. When calcium carbonate is used, surface-treated calcium carbonate and a calcium carbonate having a large particle size such as ground calcium carbonate are preferably used in combination. The surface-treated calcium carbonate preferably has a particle size of 0.5 µm or smaller, and is preferably surface-treated with a fatty acid or a fatty acid salt. The particle size of the calcium carbonate having a large particle size is preferably not less than 1 µm, and either surface-treated or non-surface-treated calcium carbonate may be used as the calcium carbonate having a large particle size.

In one or more embodiments of the curable composition of the present invention, a thixotropic agent may be used in order to prevent sagging and improve workability.

Examples of the thixotropic agent include polyamide waxes, hydrogenated castor oil derivatives, and metal soaps such as calcium stearate, aluminum stearate, and barium stearate. When powdery rubber having a particle size of 10 to 500 µm as disclosed in JP-A H11-349916 or organic fibers as disclosed in JP-A 2003-155389 are used, a composition that is highly thixotropic and has good workability can be obtained.

These thixotropic agents may be used alone, or two or more of these thixotropic agents may be used in combination.

The amount of the thixotropic agent to be used per 100 parts by weight of the component (A) is preferably 0.1 to 20 parts by weight.

In one or more embodiments of the curable composition of the present invention, an ultraviolet absorber may be used for the purpose of enhancing the surface weather resistance of the cured product.

Examples of the ultraviolet absorber include benzophenone compounds, benzotriazole compounds, salicylate compounds, substituted tolyl compounds, and metal chelating compounds, and benzotriazole compounds are particularly preferred.

Examples of benzotriazole compounds available as commercial products include Tinuvin P, Tinuvin 1130, Tinuvin 99-2, Tinuvin 928, Tinuvin 326, and Tinuvin 329 (all of which are manufactured by BASF SE).

These ultraviolet absorbers may be used alone, or two or more of these ultraviolet absorbers may be used in combination.

The amount of the ultraviolet absorber to be used per 100 parts by weight of the component (A) is preferably 0.1 to 10 parts by weight and more preferably 0.2 to 5 parts by weight.

In one or more embodiments of the curable composition of the present invention, a light stabilizer may be used for the purpose of preventing photooxidative degradation of the cured product.

Examples of the light stabilizer include benzotriazole compounds, hindered amine compounds, and benzoate compounds, and hindered amine compounds are particularly preferred.

Examples of hindered amine compounds available as commercial products include Tinuvin 770, Tinuvin 770DF, Tinuvin 292, Tinuvin 5050, Tinuvin 5151, and Tinuvin 5060 (all of which are manufactured by BASF SE).

These light stabilizers may be used alone, or two or more of these light stabilizers may be used in combination.

The amount of the light stabilizer to be used per 100 parts by weight of the component (A) is preferably 0.1 to 10 parts by weight and particularly preferably 0.2 to 5 parts by weight.

In one or more embodiments of the curable composition of the present invention, an antioxidant (age resister) may be used for the purpose of enhancing the weather resistance of the cured product.

Examples of the antioxidant include hindered phenol antioxidants, monophenol antioxidants, bisphenol antioxidants, and polyphenol antioxidants, and hindered phenol antioxidants are particularly preferred.

Examples of hindered phenol antioxidants available as commercial products include IRGANOX 1010 and IRGANOX 1035 (both of which are manufactured by BASF SE).

These antioxidants may be used alone, or two or more of these antioxidants may be used in combination.

The amount of the antioxidant to be used per 100 parts by weight of the component (A) is preferably 0.1 to 10 parts by weight and more preferably 0.2 to 5 parts by weight.

In one or more embodiments of the curable composition of the present invention, an adhesion promoter may be used for the purpose of improving adhesion to various adherends, such as: inorganic substrates including glass, aluminum, stainless, zinc, copper, and mortar; and organic substrates including vinyl chloride, acrylic, polyester, polyethylene, polypropylene, and polycarbonate, under non-primer conditions or primer treatment conditions.

Examples of the adhesion promoter include amino silanes, epoxy silanes, isocyanate silanes, mercapto silanes, vinylically unsaturated group-containing silanes, halogen-containing silanes, and isocyanurate silanes.

Examples of amino silanes include amino-group-containing silane compounds such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, N-(β-aminoethyl)-γ-aminopropyltriisopropoxysilane, N-(β-(β-aminoethyl)

aminoethyl)-γ-aminopropyltrimethoxysilane, N-(β-aminohexyl)-γ-aminopropyltrimethoxysilane, γ-(N-ethylamino)-β-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (β-aminoethyl)aminomethyltrimethoxysilane, and N,N'-bis[3-(trimethoxysilyl)propyl]ethylenediamine; and ketimine silanes such as N-(1,3-dimethylbutylidene)-3-(triethoxysilyl)-1-propaneamine.

Examples of epoxy silanes include γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane.

Examples of isocyanate silanes include γ-isocyanatepropyltrimethoxysilane, γ-isocyanatepropyltriethoxysilane, γ-isocyanatepropylmethyldiethoxysilane, γ-isocyanatepropylmethyldimethoxysilane, isocyanatemethyltrimethoxysilane, and isocyanatemethyldimethoxymethylsilane.

Examples of mercapto silanes include γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane.

Examples of carboxy silanes include β-carboxyethyltriethoxysilane, β-carboxyethylphenylbis(2-methoxyethoxy)silane, and N-β-(carboxymethyl)aminoethyl-γ-aminopropyltrimethoxysilane.

Examples of vinylically unsaturated group-containing silanes include vinyltrimethoxysilane, vinyltriethoxysilane, 3-(meth)acryloyloxypropyltrimethoxysilane, 3-(meth)acryloyloxypropylmethyldimethoxysilane, 3-(meth)acryloyloxypropyltriethoxysilane, 3-(meth)acryloyloxypropylmethyldiethoxysilane, (meth)acryloyloxymethyltrimethoxysilane, (meth)acryloyloxymethylmethyldimethoxysilane, (meth)acryloyloxymethyltriethoxysilane, and (meth)acryloyloxymethylmethyldiethoxysilane.

Examples of halogen-containing silanes include γ-chloropropyltrimethoxysilane.

Examples of isocyanurate silanes include tris(trimethoxysilyl)isocyanurate.

Among these adhesion promoters, for ensuring good adhesion, amino silanes or epoxy silanes are preferred, and γ-aminopropyltrimethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, γ-glycidoxypropyltriethoxysilane, and γ-glycidoxypropylmethyldimethoxysilane are more preferred, and γ-aminopropyltrimethoxysilane, N-(β-aminoethyl)-γ-aminopropyltrimethoxysilane, and N-(β-aminoethyl)-γ-aminopropylmethyldimethoxysilane are particularly preferred.

These adhesion promoters may be used alone, or two or more of these adhesion promoters may be used in combination.

The amount of the adhesion promoter to be used per 100 parts by weight of the component (A) is preferably 0.01 to 20 parts by weight, more preferably 0.1 to 10 parts by weight, and particularly preferably 1 to 7 parts by weight. If the amount of the adhesion promoter to be used is less than 0.01 parts by weight, sufficient adhesion may not be obtained. If the amount of the adhesion promoter to be used exceeds 20 parts by weight, the cured product may become brittle so that sufficient strength cannot be obtained, or the curing rate may decrease.

Organic balloons and inorganic balloons may be used in order to improve the workability of one or more embodiments of the curable composition of the present invention and matte the surface of the cured product. These balloons may be surface-treated. These balloons may be used alone, or two or more of these balloons may be used in combination. For improving the workability, the particle size of the balloons is preferably not larger than 0.1 mm. For matting the surface of the cured product, the particle size of the balloons is preferably 5 to 300 μm.

The balloons are spherical fillers having a hollow inside. Examples of the materials of the balloons include, but not limited to, inorganic materials such as glass, shirasu, and silica, and organic materials such as phenol resin, urea resin, polystyrene, and Saran. An inorganic material and an organic material may be formed into a composite or may be layered to form multiple layers. Inorganic balloons, organic balloons, or composite balloons thereof, etc., may be used. Also, a single type of balloon may be used, or a mixture of two or more types of balloons different in material may be used. Moreover, the surface of the balloon used may be processed or coated, or may be treated with various surface treating agents. For example, organic balloons may be coated with an agent such as calcium carbonate, talc, or titanium oxide, or inorganic balloons may be surface-treated with an adhesion promoter.

Specific examples of the balloon include those described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

In one or more embodiments of the curable composition of the present invention, a silicate may be used. This silicate serves as a crosslinking agent and thus has the function of improving the recovery, durability, and creep resistance of the component (A). In addition, the silicate also has the effects of improving adhesion, water-resistant adhesion, and the bond durability under high temperature and humidity conditions.

Examples of the silicate include tetraalkoxysilanes or partially hydrolyzed condensates thereof.

Examples of the silicates include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetraisopropoxysilane, tetra-n-butoxysilane, tetraisobutoxysilane, and tetra-tert-butoxysilane, and partially hydrolyzed condensates thereof.

From the viewpoint of the effects of improving recovery, durability, and creep resistance, partially hydrolyzed condensates of tetraalkoxysilanes are more preferably used.

Examples of the partially hydrolyzed condensates of tetraalkoxysilanes include those obtained by adding water to a tetraalkoxysilane and performing partial hydrolysis and condensation in a conventional manner. Commercially available partially hydrolyzed condensates of organosilicate compounds may be used. Examples of such condensates include Methyl Silicate 51 and Ethyl Silicate 40 (both are manufactured by COLCOAT Co., Ltd.).

These silicates may be used along, or two or more of these silicates may be used in combination.

The amount of the silicate to be used per 100 parts by weight of the component (A) is preferably 0.1 to 20 parts by weight and more preferably 0.5 to 10 parts by weight.

In one or more embodiments of the curable composition of the present invention, a tackifier may be used.

As the tackifier resin, for examples, a conventional one which may be either in the solid or liquid state at room temperature may be used.

Examples of the tackifier resin include styrene block copolymers and hydrogenated products thereof, phenol resins, cashew oil-modified phenol resins, tall oil-modified phenol resins, terpene resins, hydrogenated terpene resins, terpene phenol resins, hydrogenated terpene phenol resins, xylene-phenol resins, cyclopentadiene-phenol resins, cumarone-indene resins, rosin resins, rosin ester resins, hydrogenated rosin ester resins, xylene resins, low-molecular-weight polystyrene resins, styrene copolymer resins, petroleum resins (e.g. C5 hydrocarbon resin, C9 hydrocarbon resin, C5/C9 hydrocarbon copolymer resin), hydrogenated petroleum resins, and dicyclopentadiene petroleum resins.

Examples of styrene block copolymers and hydrogenated products thereof include styrene-butadiene-styrene block copolymers (SBS), styreneisoprene-styrene block copolymers (SIS), styrene-ethylenebutylene-styrene block copolymers (SEBS), styrene-ethylenepropylene-styrene block copolymers (SEPS), and styrene-isobutylene-styrene block copolymers (SIBS).

These tackifier resins may be used alone, or two or more of these tackifier resins may be used in combination. The amount of the tackifier resin to be used per 100 parts by weight of the component (A) is preferably 5 to 1,000 parts by weight and more preferably 10 to 100 parts by weight.

In one or more embodiments of the curable composition of the present invention, a physical property modifier may be used for the purpose of modifying the tensile properties and the hardness of the cured product.

Examples of the physical property modifiers include alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane, and reactive functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; and polysiloxanes.

In particular, compounds that generate a compound comprising a monovalent silanol group within the molecule by hydrolysis serve to decrease the modulus of the cured product without deteriorating the stickiness condition on the surface of the cured product. Compounds generating trimethylsilanol are particularly preferred.

Examples of the compounds that generate a compound having a monovalent silanol group within the molecule by hydrolysis include compounds disclosed in JP-A H05-117521; compounds generating silicon compounds that are derivatives of alkyl alcohols (e.g. hexanol, octanol, decanol), and generate trialkylsilanols (e.g. trimethylsilanol) by hydrolysis; compounds disclosed in JP-A H11-241029 which generate silicon compounds that are derivatives of polyalcohols each having three or more hydroxy groups (e.g. trimethylolpropane, glycerol, pentaerythritol, sorbitol), and generate trialkylsilanols (e.g. trimethylsilanol) by hydrolysis; compounds as disclosed in JP-A H07-258534 which generate silicon compounds that are derivatives of oxypropylene polymers and generate trialkylsilanols (e.g. trimethylsilanol) by hydrolysis; and polymers disclosed in JP-A H06-279693 which contain a cross-linkable reactive silyl group and a silyl group capable of forming a monosilanol-containing compound by hydrolysis.

These physical property modifiers may be used alone, or two or more of these physical property modifiers may be used in combination.

The amount of the physical property modifier to be used per 100 parts by weight of the component (A) is preferably 0.1 to 20 parts by weight and more preferably 0.5 to 10 parts by weight.

In one or more embodiments of the curable composition of the present invention, a compound comprising an epoxy group in each molecule may be used. When such an epoxy group-containing compound is used, the recovery of the cured product can be enhanced.

Examples of the epoxy group-containing compound include epoxidized unsaturated fats and oils, epoxidized unsaturated fatty acid esters, alicyclic epoxy compounds, and epichlorohydrin derivatives; and mixtures thereof.

Examples of the epoxy group-containing compound include epoxidized soybean oil, epoxidized linseed oil, bis(2-ethylhexyl)-4,5-epoxycyclohexane-1,2-dicarboxylate (trade name SANSO CIZER E-PS manufactured by New Japan Chemical Co., Ltd.), epoxy octyl stearate, and epoxy butyl stearate. Among these, SANSO CIZER E-PS is particularly preferred.

The amount of the epoxy group-containing compound to be used per 100 parts by weight of the component (A) is preferably 0.5 to 50 parts by weight.

In one or more embodiments, the composition of the present invention may contain a photo-curable substance. The use of a photo-curable substance results in the formation of a layer of the photo-curable substance on the surface of the cured product, thereby improving the properties of the cured product in terms of stickiness and weather resistance. The photo-curable substance refers to a substance that undergoes chemical changes in molecular structure such that changes in physical properties such as curing can be caused in a short period of time by action of light. Such substances include many known compounds such as organic monomers, oligomers, resins, and compositions containing any of them, and any commercially available ones can be used.

The photo-curable substance include unsaturated acrylic compounds, polyvinyl cinnamates, and azidized resins.

Examples of unsaturated acrylic compounds include monomers having a single or multiple (meth)acrylic unsaturated groups, oligomers thereof, and mixtures thereof, and specifically include monomers such as propylene (or butylene or ethylene) glycol di(meth)acrylate, and neopentyl glycol di(meth)acrylate, and oligoesters thereof having a molecular weight of 10,000 or lower.

Examples of the polyvinyl cinnamates include photosensitive resins with cinnamoyl groups functioning as photosensitive groups, such as those obtained by esterification of polyvinyl alcohol with cinnamic acid, as well as many derivatives of polyvinyl cinnamate.

Azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). These may be used alone or may be mixed, optionally together with a sensitizer added thereto. In some cases, the addition of a sensitizer (e.g. ketones, nitro compounds) or an accelerator (e.g. amines) enhances the effect.

The photo-curable substance is preferably used in an amount of 0.1 to 20 parts by weight, more preferably 0.5 to 10 parts by weight, for each 100 parts by weight of the component (A). An amount of less than 0.1 parts by weight tends not to provide the effect of enhancing weather resistance, whereas an amount of more than 20 parts by weight tends to make the resulting cured product so hard that cracking can be caused.

In one or more embodiments, the composition of the present invention may contain an oxygen-curable substance. Examples of the oxygen-curable substances include unsaturated compounds that can react with oxygen in the air. The oxygen-curable substances serve to prevent surface stickiness and the attachment of dirt or dust to the surface of the cured product by reacting with oxygen in the air to form a cured layer around the surface of the cured product.

Examples of the oxygen-curable substance include drying oils such as tung oil and linseed oil, and various alkyd resins obtained by modification of these compounds; and drying oil-modified acrylic polymers, epoxy resins, and silicone resins; liquid polymers such as 1,2-polybutadiene, 1,4-polybutadiene and polymers of C5-C8 dienes, which are obtainable by polymerizing or copolymerizing diene compounds (e.g. butadiene, chloroprene, isoprene, and 1,3-pentadiene), liquid copolymers such as NBR and SBR, which are obtainable by copolymerizing the diene compound and a monomer copolymerizable therewith (e.g. acrylonitrile, styrene) such that the diene compound serves as the main component, and various modified products thereof (e.g. maleate-modified products, boiled-oil-modified products).

The oxygen-curable substances may be used alone, or two or more of these may be used in combination. Particularly preferred among these are tung oil and liquid diene polymers. The combined use with a catalyst or metal dryer for promoting the oxidative curing reaction can enhance the effect in some cases. Examples of the catalysts and metal dryers include metal salts such as cobalt naphthenate, lead naphthenate, zirconium naphthenate, cobalt octylate, and zirconium octylate, and amine compounds.

The amount of the oxygen-curable substance to be used per 100 parts by weight of the component (A) is preferably 0.1 to 20 parts by weight and more preferably 0.5 to 10 parts by weight. If the amount is less than 0.1 parts by weight, improvement of stain resistance tends to be insufficient. If the amount exceeds 20 parts by weight, the tensile properties and the like of the cured product tend to be impaired.

As described in JP-A H03-160053, the oxygen-curable substance is preferably used in combination with a photo-curable substance.

In one or more embodiments, the curable composition of the present invention may contain a flame retardant such as phosphorus plasticizers such as ammonium polyphosphate and tricresyl phosphate, aluminum hydroxide, magnesium hydroxide, and thermoexpandable graphite. These flame retardants may be used alone, or two or more of these may be used in combination.

The amount of the flame retardant per 100 parts by weight of the component (A) is preferably 5 to 200 parts by weight and more preferably 10 to 100 parts by weight.

In one or more embodiments, the curable composition of the present invention may optionally contain various additives in order to adjust physical properties of the curable composition or a cured product thereof. Examples of the additives include curability modifiers, radical inhibitors, metal deactivators, antiozonants, phosphorus-containing peroxide decomposers, lubricants, pigments, blowing agents, repellents for ants, and antifungal agents. These additives may be used alone, or two or more of these may be used in combination. Specific examples of the additives other than the ones specifically mentioned herein are described in, for example, JP-B H04-69659, JP-B H07-108928, JP-A S63-254149, JP-A S64-22904, and JP-A 2001-72854.

The types of the curable composition include a one-component composition for which all ingredients are mixed, and a two-component composition for which a polymer that is a principal component, and a curing catalyst and the other ingredients are separately stored in different packages, and are mixed immediately prior to use. In one or more embodiments, the curable composition of the present invention can be used as either type. However, in one or more embodiments, the curable composition of the present invention is suitable to be used as a one-component composition, because use thereof is easy.

In the case where the curable composition is prepared in a one-component form, since all the formulation components are previously mixed, it is preferred that the water-containing formulation components be dehydrated and dried prior to use, or be dehydrated by, for example, the application of reduced pressure during mixing and kneading. In the case where the curable composition is prepared in a two-component form, since the curing catalyst needs not be mixed in the base mixture containing the reactive silyl group-containing organic polymer, gelation is less likely to occur even when a small amount of water remains in the mixture. However, dehydration and drying are preferably performed when long-term storage stability is required. Suitable methods for dehydration and drying are thermal drying or dehydration under reduced pressure in the case of solids such as powder, and dehydration under reduced pressure or dehydration using, for example, synthetic zeolite, active alumina, silica gel, quick lime, or magnesium oxide in the case of liquids. In addition to these methods for dehydration and drying, dehydration may also be carried out by adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane, to react with water. Alternatively, dehydration may be performed by adding an oxazolidine compound such as 3-ethyl-2-methyl-2-(3-methylbutyl)-1,3-oxazolidine to react with water. Yet alternatively, dehydration may be performed by adding a small amount of an isocyanate compound to react water with the isocyanato group. The storage stability can be improved by adding an alkoxysilane compound, oxazolidine compound, or isocyanate compound.

The amount of a dehydrating agent, particularly, a silicon compound that can react with water such as vinyltrimethoxysilane, to be used per 100 parts by weight of the organic polymer (A) having a reactive silyl group is preferably 0.1 to 20 and more preferably 0.5 to 10 parts by weight.

In one or more embodiments, the curable composition of the present invention may be prepared by any methods including commonly used methods such as in which the above components are mixed and kneaded at room temperature or under heat with, for example, a mixer, roller, or a kneader; or in which the components are dissolved in a small amount of an appropriate solvent and then mixed.

When exposed to the air, one or more embodiments of the curable composition of the present invention may form a three-dimensional network structure by the action of moisture, whereby it is cured into a rubbery, elastic solid.

In one or more embodiments, the curable composition of the present invention is usable for, for example, pressure-sensitive adhesives; sealants for buildings, ships, automobiles, roads, or other applications; adhesives; impression materials; vibration-proof materials; damping materials; soundproof materials; expanded/foamed materials; coating compositions; and spray coatings. In one or more embodiments, the curable composition of the present invention is more preferably used as a sealant or an adhesive among theses, because the curable composition gives a cured product having excellent flexibility and adhesion.

Furthermore, the curable composition is usable for various applications including electric and electronic part materials (e.g. solar cell backside sealants); electrical insulating materials (e.g. insulating coating materials for electric wires and cables); elastic adhesives; contact adhesives; spray sealants; crack repair materials; tile adhesives; powder coating compositions; casting materials; rubber materials for medical use; pressure-sensitive adhesives for medical use; sealants for medical devices; food packaging materials; sealants for joints of exterior materials such as siding board; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts and the like.

Furthermore, the curable composition can also be used as various hermetically sealing compositions and adhesive compositions because it, either alone or with use of a primer, can adhere tightly to a wide range of substrates such as glass, ceramics, wood, metals, and resin moldings. In addition, in one or more embodiments, the curable composition of the present invention can also be used for adhesives for interior panels, adhesives for exterior panels, tile adhesives, stone pitching adhesives, ceiling finishing adhesives, floor finishing adhesives, wall finishing adhesives, vehicle panel adhesives, adhesives for electric/electronic/precision device assembling, sealants for direct grading, sealants for multi-layered glass, sealants for SSG construction method, sealants for working joints for buildings, and waterproof materials used with asphalt.

The present application claims for benefit of priority based on Japanese Patent Application No. 2014-042768 filed on Mar. 5, 2014. The entirety of the specification of Japanese Patent Application No. 2014-042768 filed on Mar. 5, 2014 is incorporated herein for reference.

EXAMPLES

Hereinafter, the present invention will be described in more detail by means of examples, but is not limited by these examples.

Synthesis Example 1

Polymerization of propylene oxide was performed in the presence of a zinc hexacyanocobaltate-glyme complex catalyst with, as an initiator, a 1/1 (weight ratio) mixture of a polyoxypropylene diol having a molecular weight of approximately 2,000 and a polyoxypropylene triol having a molecular weight of approximately 3,000, to give a hydroxy group-terminated polypropylene oxide having a number average molecular weight of approximately 19,000 (polystyrene-equivalent molecular weight measured by using liquid feeding system: GPC of HLC-8120 manufactured by Tosoh Corporation, column: TSK-GEL H type manufactured by Tosoh Corporation, solution: THF). After 1.2 equivalents of NaOMe in methanol per hydroxy group of the hydroxy group-terminated polypropylene oxide was added, the methanol was distilled off, and 1.7 equivalents of allyl chloride per hydroxy group was further added to convert the terminal hydroxy group to an allyl group.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. As a result of these operations, an allyl group-terminated polypropylene oxide having a number average molecular weight of approximately 19,000 was obtained.

The allyl group-terminated polypropylene oxide (100 parts by weight) was reacted with methyldimethoxysilane (1.35 parts by weight) at 90° C. for 2 hours in the presence of an isopropanol solution of a platinum-vinylsiloxane complex (150 ppm, platinum content: 3% by weight) as a catalyst.

As a result, a polyoxypropylene polymer (A-1) was obtained which has a number average molecular weight of 19,000 (polystyrene-equivalent molecular weight measured by GPC) and has an average number of terminal methyldimethoxysilyl groups of 1.7 per molecule, measured by analysis with $^1$H-NMR.

Example 1

Bis(2-ethylhexyl)terephthalate (trade name EASTMAN 168 manufactured by Eastman Chemical Company, 35 parts by weight), which is a terephthalic acid ester compound, as a plasticizer, dimethyl adipate (trade name DMA manufactured by Daihachi Chemical Industry Co., Ltd., 20 parts by weight) as a compound having a methyl ester group, surface-treated calcium carbonate (trade name Hakuenka CCR manufactured by Shiraishi Calcium Kaisha, Ltd., 120 parts by weight), titanium oxide (trade name Tipaque R-820 manufactured by Ishihara Sangyo Kaisha Ltd., 20 parts by weight), a thixotropic agent (trade name Disparlon 6500 manufactured by Kusumoto Chemicals Ltd., 2 parts by weight), an ultraviolet absorber (trade name Tinuvin 326 manufactured by BASF SE, 1 part by weight), and a light stabilizer (trade name Tinuvin 770 manufactured by BASF SE, 1 part by weight) were weighed out and mixed by a spatula in the polymer (A-1) (100 parts by weight) obtained in Synthesis Example 1. Then, the mixture was passed through a three-roll paint mill three times for well dispersion. Then, the mixture was dried under reduced pressure for 2 hours at 120° C., and cooled to 50° C. or lower. Thereafter, to the mixture, vinyltrimethoxysilane (trade name A-171 manufactured by Momentive Performance Materials Inc., 2 parts by weight) as a dehydrating agent, and N-(β-aminomethyl)-γ-aminopropyltrimethoxysilane (trade name KBM 603 manufactured by Shin-Etsu Chemical Co., Ltd., 3 parts by weight) as an adhesion promoter were added and mixed. To the mixture, dibutyltin bis(acetylacetonate) (trade name NEOSTANN U-220H manufactured by Nitto Kasei Co., Ltd., 2 parts by weight) as a condensation catalyst was further added and mixed, to give a curable composition. The obtained curable composition was packed and hermetically sealed in a moisture-proof container, to give a one-component curable composition.

Example 2

A one-component curable composition was obtained in the same manner as in Example 1, except that a mixture comprising methyl oleate and methyl linoleate (trade name TFE-MED manufactured by Tsuno Food Industrial Co., Ltd., 20 parts by weight) as principal components was used instead of dimethyl adipate (20 parts by weight) in Example 1.

Example 3

A one-component curable composition was obtained in the same manner as in Example 1, except that bis(2-ethylhexyl)isophthalate (trade name DOIP manufactured by CG Ester Corporation, 35 parts by weight), which is an isophthalic acid ester compound, as a plasticizer was used instead of the terephthalic acid ester compound (35 parts by weight) in Example 1.

Comparative Example 1

A one-component curable composition was obtained in the same manner as in Example 1, except that a terephthalic acid ester compound (EASTMAN 168, 55 parts by weight) was used instead of the terephthalic acid ester compound (EASTMAN 168, 35 parts by weight) and dimethyl adipate (20 parts by weight) in Example 1.

Comparative Example 2

A one-component curable composition was obtained in the same manner as in Example 3, except that an isophthalic acid ester compound (DOIP, 55 parts by weight) was used instead of the isophthalic acid ester compound (DOIP, 35 parts by weight) and dimethyl adipate (20 parts by weight) in Example 3.

Comparative Example 3

A one-component curable composition was obtained in the same manner as in Example 1, except that diisodecyl phthalate (trade name DIDP manufactured by J-PLUS Co., Ltd., 55 parts by weight) as a plasticizer was used instead of the terephthalic acid ester compound (EASTMAN 168, 35 parts by weight) and dimethyl adipate (20 parts by weight) in Example 1.

Comparative Example 4

A one-component curable composition was obtained in the same manner as in Example 2, except that a compound having a methyl ester group (TFE-MED, 55 parts by weight) was used instead of the terephthalic acid ester compound (EASTMAN 168, 35 parts by weight) and the compound having a methyl ester group (TFE-MED, 20 parts by weight) in Example 2.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| (A) Component | A-1 | 100 | 100 | 100 | 100 | 100 | 100 | 100 |
| Plasticizer | EASTMAN 168 | 35 | 35 | | 55 | | | |
| ((B) Component) | DOIP | | | 35 | | 55 | | |
| Plasticizer other than (B) Component | DIDP | | | | | | 55 | |
| (C) Component | Dimethyl adipate | 20 | | 20 | | | | |
| Compound having methyl ester group | TFE-MED | | 20 | | | | | 55 |
| Filler | Hakuenka CCR | 120 | 120 | 120 | 120 | 120 | 120 | 120 |
| Titanium oxide | Tipaque R-820 | 20 | 20 | 20 | 20 | 20 | 20 | 20 |
| Thixotropic agent | Disparlon 6500 | 2 | 2 | 2 | 2 | 2 | 2 | 2 |
| Ultraviolet absorber | Tinuvin 326 | 1 | 1 | 1 | 1 | 1 | 1 | 1 |
| Light stabilizer | Tinuvin 770 | 1 | 1 | 1 | 1 | 1 | 1 | 1 |
| Adhesion promoter | KBM 603 | 3 | 3 | 3 | 3 | 3 | 3 | 3 |
| Dehydrating agent | A-171 | 2 | 2 | 2 | 2 | 2 | 2 | 2 |
| Curing catalyst | U-220H | 2 | 2 | 2 | 2 | 2 | 2 | 2 |
| Depth curability (23° C., 50% RH) | After 1 day (mm) | 5.0 | 5.0 | 4.0 | 4.0 | 3.0 | 2.5 | 4.0 |
| | After 3 days (mm) | 7.5 | 7.5 | 6.5 | 6.5 | 5.5 | 4.0 | 7.0 |
| | After 7 days (mm) | 12.0 | 12.0 | 10.0 | 9.5 | 8.5 | 8.0 | 10.5 |
| Skin formation time (23° C., 50% RH) | Before storage (min) | 35 | 20 | 45 | 30 | 25 | 40 | 50 |
| | After storage (min) | 180 | 120 | 180 | 870 | 1030 | 90 | 30 |
| Tensile properties (23° C. * 3 days, 50% RH +50° C. * 4 days) | Before storage | Tensile strength at break (MPa) | 2.8 | 2.3 | 2.9 | 2.3 | 2.2 | 1.8 | 2.2 |
| | | Elongation at break (%) | 730 | 700 | 640 | 730 | 550 | 660 | 630 |
| | After storage | Tensile strength at break (MPa) | 2.8 | 2.4 | 2.8 | 2.6 | 2.4 | 2.0 | 2.0 |
| | | Elongation at break (%) | 710 | 680 | 630 | 780 | 690 | 630 | 580 |

The physical properties of the curable compositions obtained above were determined by the following methods.

(Depth Curability)

Each curable composition was poured into a cylindrical polyethylene container having a diameter of 12 mm carefully so that no air bubbles were entrained, and the surface of the composition was flattened to produce a specimen. The specimen was allowed to stand at 23° C. and 50% RH for 1 day, for 3 days, and for 7 days, then a cured portion thereof was taken out, an adhering uncured portion was removed, and the thickness of the cured portion was measured by using a caliper. The test results are shown in Table 1.

(Skin Formation Time)

Each curable composition was poured into an ointment can having a depth of approximately 5 mm, and the surface of the composition was flattened. The time point at which the surface was flattened was defined as a curing start time. The surface of the composition was touched by a spatula, and the time period required for the composition to no longer stick to the spatula (regarded as skin formation time) was determined. The test conditions were 23° C. and 50% RH. The test results are shown in Table 1.

In addition, each curable composition was cured at 50° C. for 4 weeks in a hermetically sealed state, and then the skin formation time was measured. The test conditions were 23° C. and 50% RH. The test results are shown in Table 1.

(Tensile Properties)

Each curable composition was poured into a polyethylene mold having a thickness of 3 mm in the atmosphere of 23° C. and 50% RH carefully so that no air bubbles were entrained. Then, the composition was cured at 23° C. and 50% RH for 3 days and further at 50° C. for 4 days, so that a cured product was obtained. According to JIS K6251, No. 3 dumbbell specimens were punched out from the obtained cured product, and subjected to tensile tests (tensile rate: 200 mm/min, 23° C., 50% RH) to measure the tensile strength at break and the elongation at break.

In addition, each curable composition was cured at 50° C. for 4 weeks in a hermetically sealed state, and then the tensile properties were measured. The test results are shown in Table 1.

As is obvious from Table 1, embodiments of the curable composition of the present invention are found to have excellent depth curability. In addition, embodiments of the curable composition of the present invention are also found to improve skin formation time and tensile properties.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A curable composition comprising:
   (A) an organic polymer consisting of polyoxyalkylene polymers having a reactive silyl group;
   (B) at least one ester compound (except for compounds having a methyl ester group) selected from the group consisting of isophthalic acid ester compounds, terephthalic acid ester compounds, 1,3-cyclohexanedicarboxylic acid ester compounds, and 1,4-cyclohexanedicarboxylic acid ester compounds;
   (C) at least one compound selected from the group consisting of saturated aliphatic carboxylic acid methyl esters, unsaturated aliphatic carboxylic acid methyl esters, and aliphatic dicarboxylic acid dimethyl esters; and
   a tetravalent organic tin compound as a curing catalyst for the component (A).

2. The curable composition according to claim 1, wherein the polyoxyalkylene polymers are polyoxypropylene polymers.

3. The curable composition according to claim 1, wherein the reactive silyl group of the component (A) is represented by formula (1):

$$—Si(R^1{}_{3-n})X_n \qquad (1),$$

wherein $R^1$ represents an alkyl group having 1 to 20 carbon atoms, an aryl group having 6 to 20 carbon atoms, or an aralkyl group having 7 to 20 carbon atoms; when two or more $R^1$ groups are present, the $R^1$ groups may be the same or different from each other; X represents a hydroxyl group or a hydrolyzable group; when two or more Xs are present, the Xs may be the same or different from each other; and n represents an integer of 1 to 3.

4. The curable composition according to claim 1, wherein the reactive silyl group of the component (A) is represented by formula (2):

$$—SiR^1X_2 \qquad (2),$$

wherein $R^1$ and X are the same as $R^1$ and X in formula (1).

5. The curable composition according to claim 1, wherein the reactive silyl group of the component (A) is a methyldimethoxysilyl group.

6. The curable composition according to claim 1, wherein the component (B) is represented by formula (3):

$$R^2OOC—P—COOR^3 \qquad (3),$$

wherein $R^2$ and $R^3$ each independently represent a linear, branched, and/or alicyclic hydrocarbon group having 2 to 20 carbon atoms or a substituted and/or unsubstituted aromatic hydrocarbon group, and P represents a 1,3-phenylene group, a 1,4-phenylene group, a cyclohexane-1,3-diyl group, and/or a cyclohexane-1,4-diyl group.

7. The curable composition according to claim 1, wherein the component (B) is represented by formula (4):

$$R^2OOC—P^1—COOR^2 \qquad (4)$$

wherein $R^2$ represents a linear and/or branched hydrocarbon group having 2 to 20 carbon atoms, and $P^1$ represents a 1,3-phenylene group and/or a 1,4-phenylene group.

8. The curable composition according to claim 1, wherein the component (C) has a molecular weight of 300 or lower.

9. The curable composition according to claim 1, wherein the component (C) is an unsaturated aliphatic carboxylic acid methyl ester and/or an aliphatic dicarboxylic acid dimethyl ester.

10. The curable composition according to claim 1, wherein the tetravalent organic tin compound is a dibutyltin compound and/or a dioctyltin compound.

11. A one-component curable composition which is the curable composition according to claim 1 as a one-component type.

12. A sealant for which the curable composition according to claim 1 is used.

13. An adhesive for which the curable composition according to claim 1 is used.

14. A cured product obtained by curing the curable composition according to claim 1.

* * * * *